(12) United States Patent
Reichwein et al.

(10) Patent No.: US 6,482,318 B1
(45) Date of Patent: Nov. 19, 2002

(54) METHOD AND DEVICE FOR THE TREATMENT OF FLUIDS

(76) Inventors: Dietrich Reichwein, Bergstrasse 5 Top 26, Zall am See A-5700 (AT); Olaf Paters, Holztratten 17, Dallach/Drau A-9772 (AT)

( * ) Notice: Subject to any disclaimer, the term of this patent is extended or adjusted under 35 U.S.C. 154(b) by 0 days.

(21) Appl. No.: 09/830,603

(22) PCT Filed: Nov. 22, 2000

(86) PCT No.: PCT/DE00/04132

§ 371 (c)(1),
(2), (4) Date: Apr. 30, 2001

(87) PCT Pub. No.: WO01/38226

PCT Pub. Date: May 31, 2001

(51) Int. Cl.[7] ................................................. C02F 1/48
(52) U.S. Cl. ..................... 210/222; 204/157.15; 422/23; 210/97
(58) Field of Search .......................... 422/23; 210/222; 261/77; 242/430 T; 335/299; 204/157.15

(56) References Cited

U.S. PATENT DOCUMENTS 4,299,701 A * 11/1981 Garrett et al. ............... 210/222
5,925,292 A * 7/1999 Ziesenis ....................... 261/77

FOREIGN PATENT DOCUMENTS

| DE | 195 43 573 A1 | 11/1995 | ............ H01F/5/00 |
|---|---|---|---|
| IT | 0 670 288 A1 | 2/1994 | ............ C02F/1/48 |
| JP | 02081404 A | * 3/1990 | |
| JP | 09314135 | 1/1996 | ............ C02F/1/30 |
| NL | 0 357 102 A2 | 7/1989 | ............ C02F/1/48 |
| NL | 0357102 A2 | * 3/1990 | |
| WO | WO 98/30501 | 1/1998 | ............ C02F/1/00 |

OTHER PUBLICATIONS

Greenwood, N. and Eamshaw, A., "Chemistry of the Elements," Pergamon Press.
Wagner, Ivo and Schmidt, Michael, "Untersuchungen zur Wirksamkeit von Geräten zur physikalischen Wasserbehadlung," gwf–wasser/abwasser 1985.
Falbe, J. and Regitz, M., "Chemie," Rompp.

* cited by examiner

Primary Examiner—Robert J. Warden, Sr.
Assistant Examiner—Sean E. Conley
(74) Attorney, Agent, or Firm—Brinks Hofer Gilson & Lione

(57) ABSTRACT

A device and method are disclosed, with which fluids can be treated, in particular, with which their properties can be improved. The device and method use a Klein-type field coil, through which the water to be treated is fed. According to the invention, at least one Klein-type double-coil is arranged around a through-flow pipe (3), through which the water to be treated is passed.

22 Claims, 8 Drawing Sheets

Figure 1:
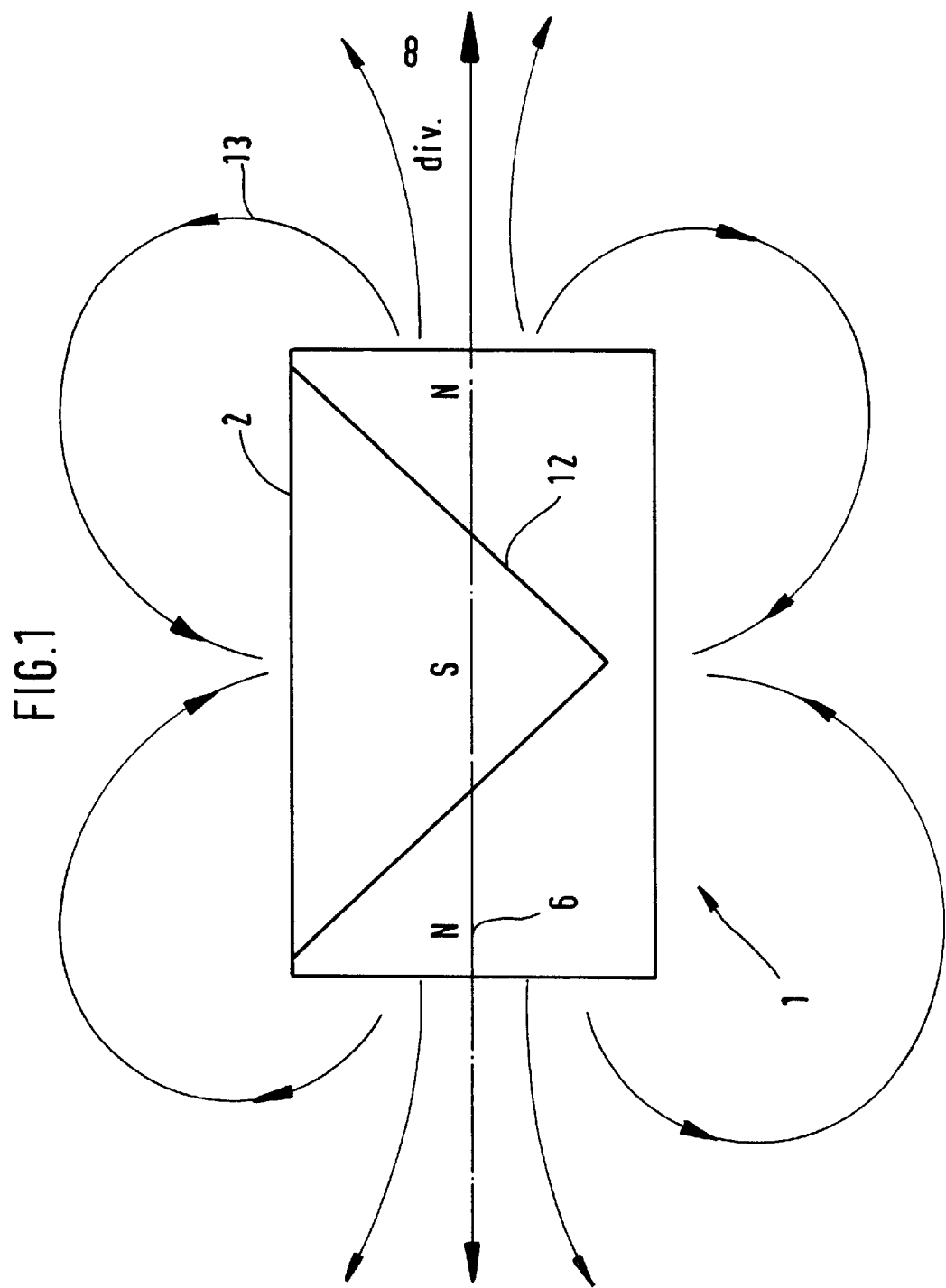

FIG.7
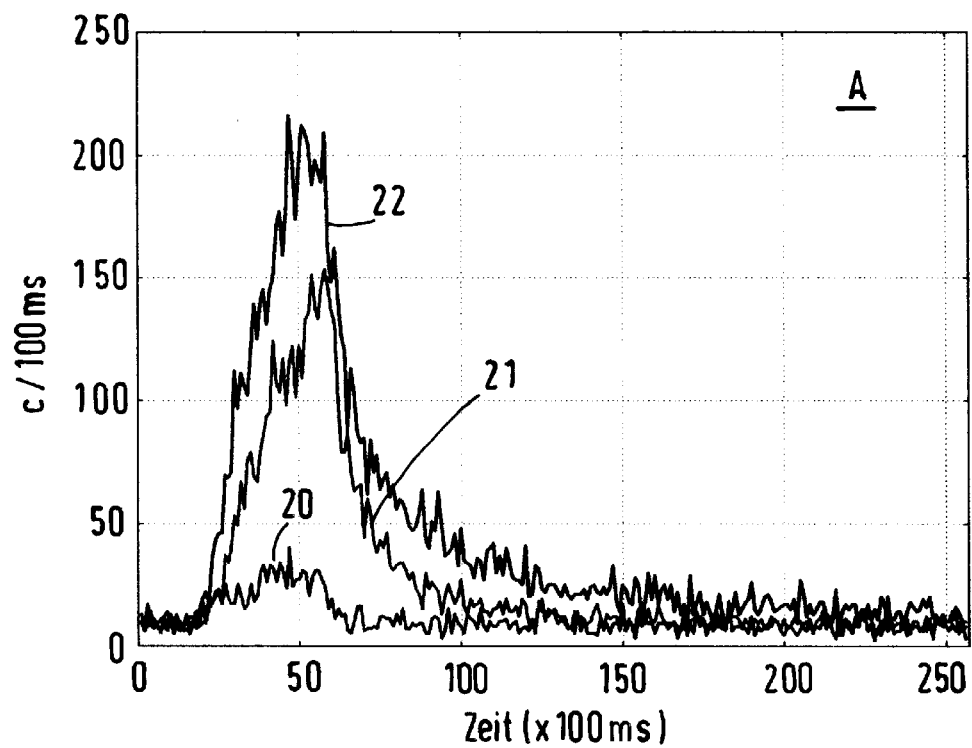
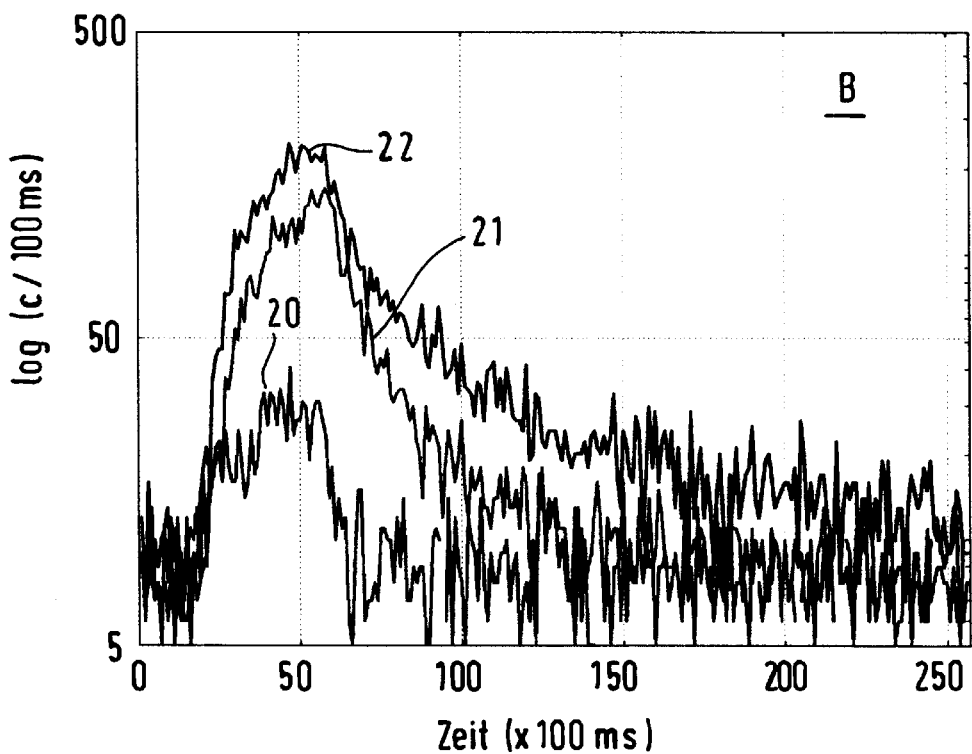

FIG.8
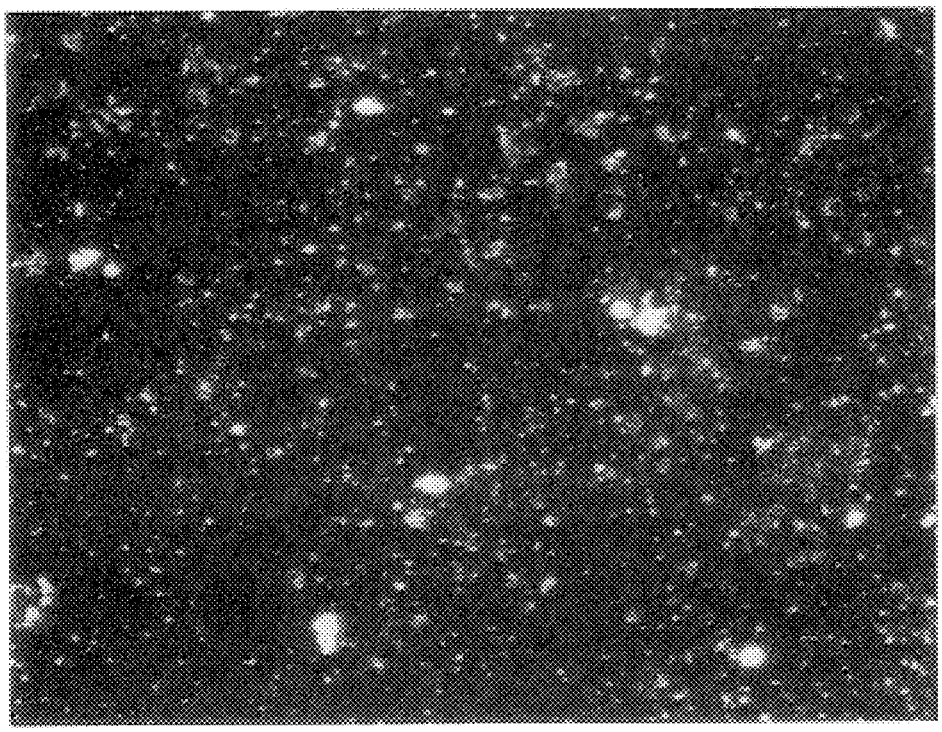
A
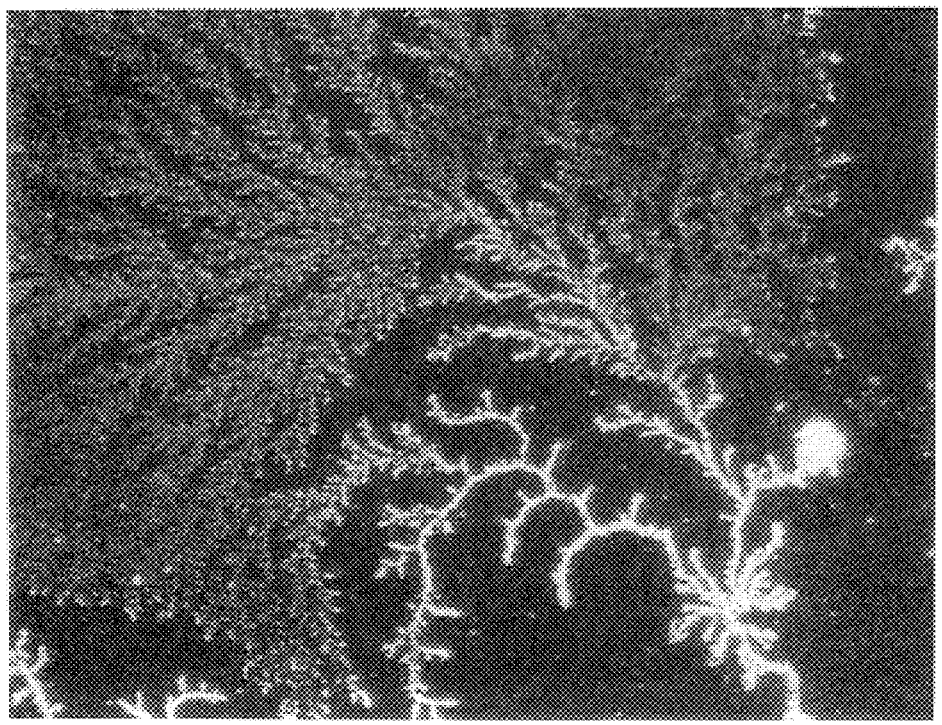
B

METHOD AND DEVICE FOR THE TREATMENT OF FLUIDS

This application concerns an apparatus and a method for treating fluids. Such apparatuses and methods are used wherever fluids are used in the execution of a process or needed as an end product. Such a need typically exists in the beverage industry, with regards to drinking water, water for general use, surface and depth water, industrial water of any kind as well as technical fluids of any kind, such as fluids used as fuel or water used in the cooling cycle of combustion engines.

The molecular composition of water is H—O—H or $H_2O$. However, this formula only applies to the vaporous state of water. When water condenses into a liquid state, the formula becomes much more complex. It can be said that water, besides polymer cluster formations, also contains liquid crystals with variable bonds. This means that water changes its structure in reaction to internal and external forces and fields. The special characteristics and anomalies of water, e.g., that it reaches its greatest expansion at 4° C., expands during cooling, and changes its surface tension in relationship to the existing cluster formation, are caused by the unique bonding of two hydrogen atoms to one oxygen atom.

Water has an unusually high dipole moment. The size of this dipole moment depends on the local charge separation inside the molecule. This dipole moment is responsible for the high dissolving capacity for certain substances, e.g., sodium chloride, and is also responsible for the known anomalies. Due to its strong polar characteristics a water molecule aligns itself easily in an electrical field.

The dipole moment of water is so high because $H_2O$ molecules bond together through the hydrogen bridge to form polymer cluster chains in such a way that the positively charged nuclei of the hydrogen atoms are openly exposed as their electrons are linked into the paths of the oxygen atom. This creates an enormous positive electrostatic force known as a hydrogen bond.

Water from different sources displays significant quality differences compared to general surface and depth water.

Natural spring water typically drops from large heights onto rocks and forces very fine, non-neutral colloids out of the rocks on impact. Driven by mass attraction, these colloids embed themselves between the two H atoms and, due to their electrical charge, possibly enlarge the bonding angle.

There are several known fluid treatment apparatuses and devices currently available which are successfully used for many different tasks, such as extremely fine filtering, reversed osmosis, the elimination of sediments on pipe walls as well as various separation and sterilization tasks. Additionally, methods have been developed which mix certain amounts of artificially produced charged colloids with water to imitate the natural process affecting spring water. The disadvantages of these methods are the costs of producing the colloids and the lack of precision in applying a correct amount of colloid particles appropriate for the treated amount of H—O—H.

The goal of the invention described herein is to offer an apparatus and a method for treating fluids.

This goal is achieved by the apparatus according to claim 1 and the method according to claim 14 as well as the applications according to the claims 17 to 19. Further advantageous variations of the apparatus and method of the invention are described in the additional dependent claims.

The invention described herein is intended for the improvement of the characteristics of fluids, such as water which typically appears in polymer cluster formations. The solution offered by the present invention is based on the observation that the quality of fluids, such as water, is changed, perhaps due to structural influences, if such fluids are moved into mono-polar or quasi-single pole magnetic fields with predetermined speed.

The method and the apparatus according to the invention can be used for treating fresh water, stagnant water, industrial effluent, surface and depth water as well as industrial water of any kind. They are also useful for treating technical fluids, such as fuels.

The method applies familiar Klein field coils for the actual structural treatment of the water. These coils are typically characterized by magnetic field lines which assume the topology of a Klein bottle. Such Klein coils are described by Shinichi SEIKE, "The Principles of Ultrarelativity," Space Research Institute, Uwajima, Nonomiya Press, JAPAN.

If such Klein coils are wrapped in opposing directions they produce magnetic quasi-single poles in which both coil ends have the same polarity whereas the opposite pole is placed at the center of the coil. Two-thirds (⅔) of the field force is present at the end poles and one-third (⅓) in the center of the coil. Since magnetic field lines always form a closed loop, one-sixth of each pole end field cannot be compensated by the middle pole, thus creating an infinite divergence (div ∞) similar to electrical field lines.

If water flows through such open field lines, its structure is probably changed.

According to the invention, any number of Klein double coils (minimally one) are placed over a flow pipe. The shape and the type of the pipe as well as the type of the installation can be customized to the particular circumstances.

However, turbulent flow conditions in the flow pipe offer certain advantages over laminar flow. Flow speed, field force and length of exposure to the Klein magnetic field need to be in correlation to each other in order to change the structure of all H—O—H molecules. Just as in natural sources, arbitrary mixtures of polymer cluster chains and liquid crystals will form below the flow dependent parameters.

It is preferable to adjust the quantity ratio by controlling the strength of the current with electrical or electronic devices according to the chosen criteria.

To generate the appropriate turbulent flow, it is advantageous to place conical disks inside the flow pipe at the input opening of the device. At least one conical disk is required. However, several disks can also be placed in a series behind each other.

Besides the serial placement, it is possible to arrange the conical disks individually or in groups leaving space between them along the flow pipe. Additionally, parts or all of the flow pipe can contain vortex bodies between the vortex or conical disks (or even in the absence of any conical disks). Glass beads of various sizes are particularly suited for use as vortex bodies. This will assure that turbulent flow occurs at all possible flow speeds along the full effective length of the electromagnetic field.

The coil can optionally be supplied with an alternating or direct current or, if appropriate, with a positive square wave current. The frequency of this alternating or positive square wave current can be adjusted to the appropriate resonance frequencies of algae, parasites, bacteria, and viruses, etc. in the water to be treated. Preferably, the electronic control is conducted through a freely selectable broad band using familiar sweeper control and applying freely selectable time criteria. This will allow suppression, for example, of undesirable algae and virus growth during by-pass circulation in swimming pools.

The apparatus and method according to the invention can be used with particular advantage for generating high-quality water, e.g., in the beverage industry. The processes which produce high-quality spring water in nature can now be technically imitated and performed. Additionally, the apparatus and method of the invention can also be used in the cooling cycle of combustion engines.

Cooling water which has been treated according to the invention will help to flush out deposits in the engine and, unlike regular water, will leave no deposits behind. The water-flushed volume will be kept clean so that temperature transition values according to the engine specifications will be achieved for the life of the engine. It has been shown that treated engine fuels lead to significant improvements in fuel consumption due to the improved atomization which can be achieved by employing the apparatus and method. Additionally, complete combustion leads to significantly reduced exhaust emissions. This effect is explained as a result of the enhanced diffusion of the fuels which changes droplets into a fine fuel mist.

The following section will describe a few examples of apparatuses and methods according to the invention.

The figures show:

FIG. 1 the field distribution of a Klein double coil

Figure 2:
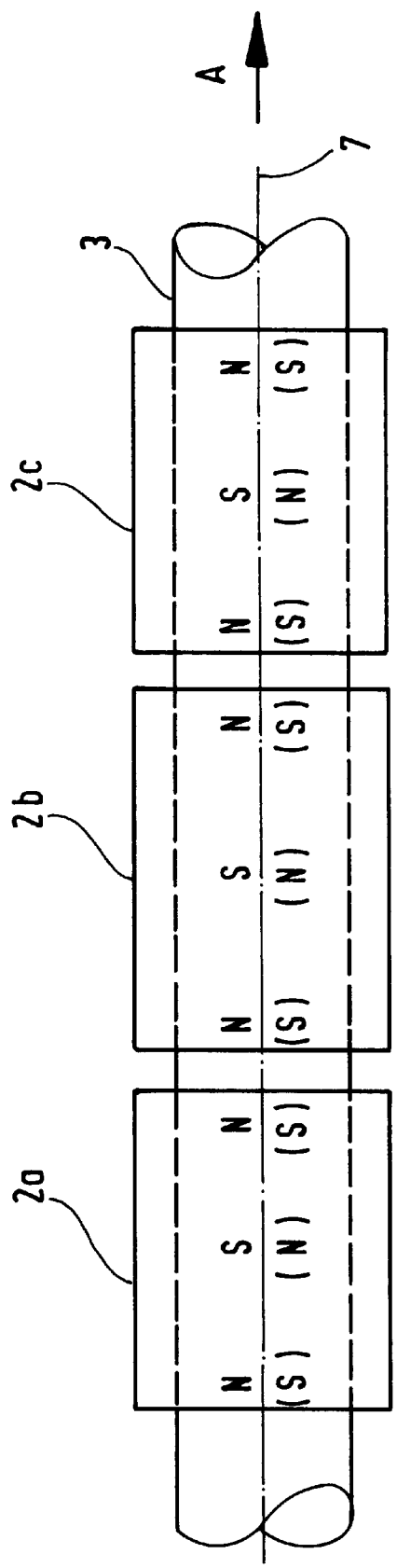

FIG. 2 an apparatus according to the invention

Figure 3:
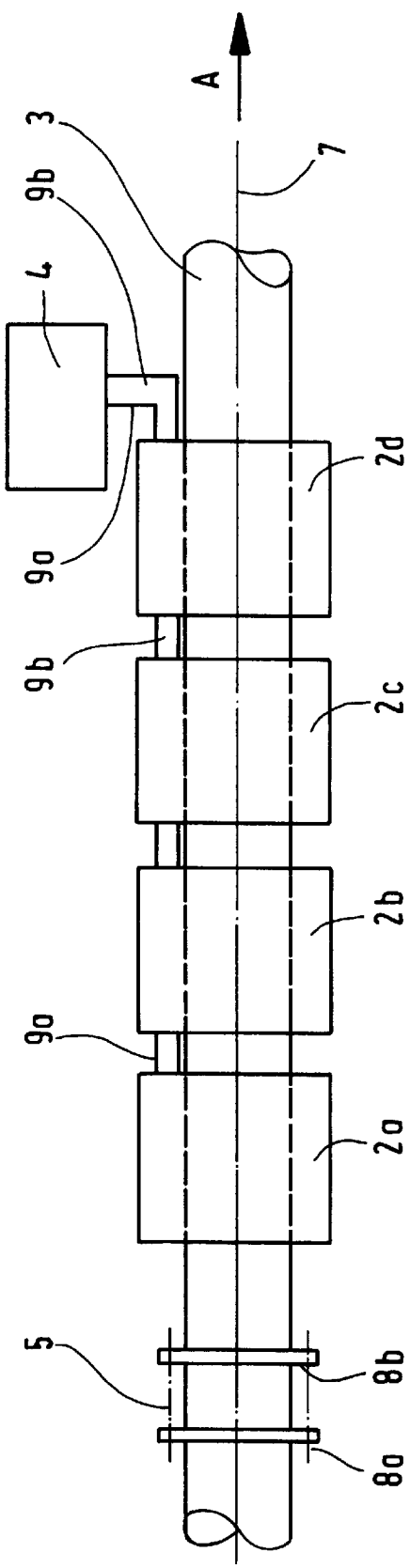

FIG. 3 another apparatus according to the invention with a conical disk insert

Figure 4:
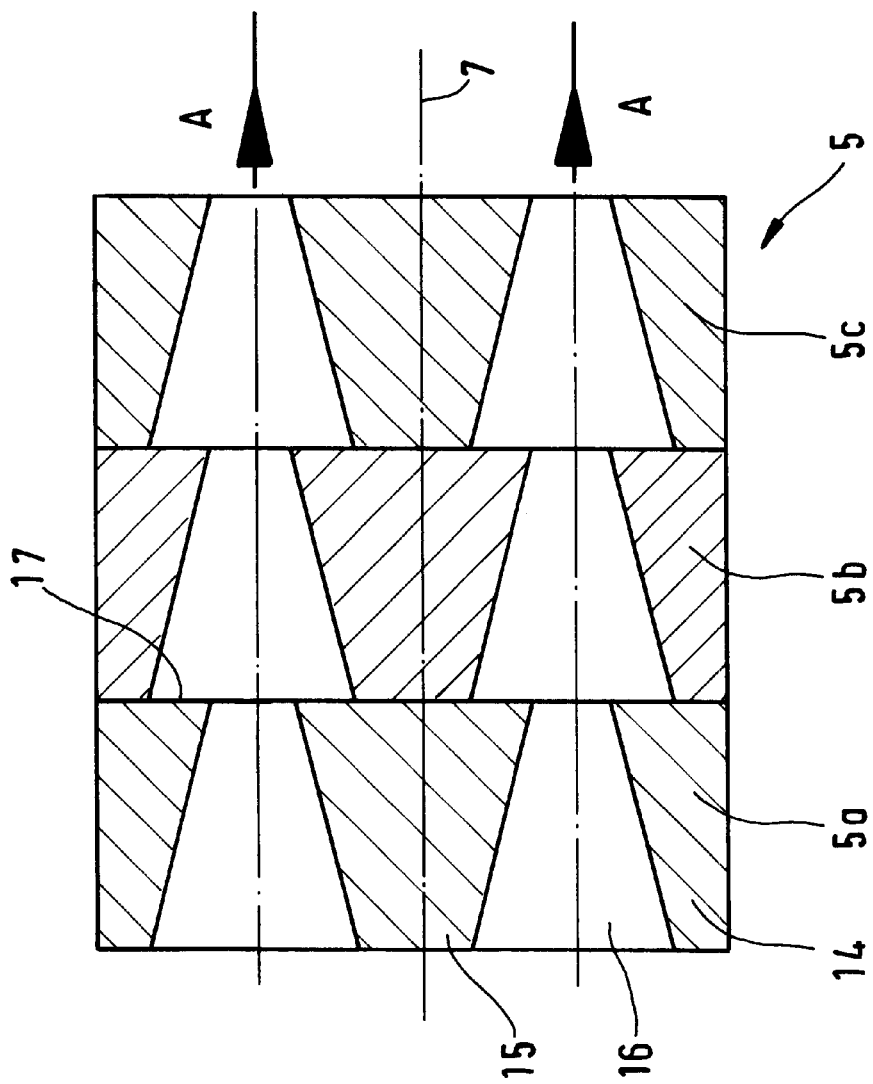

FIG. 4 the conical disks shown in FIG. 3

Figure 5:
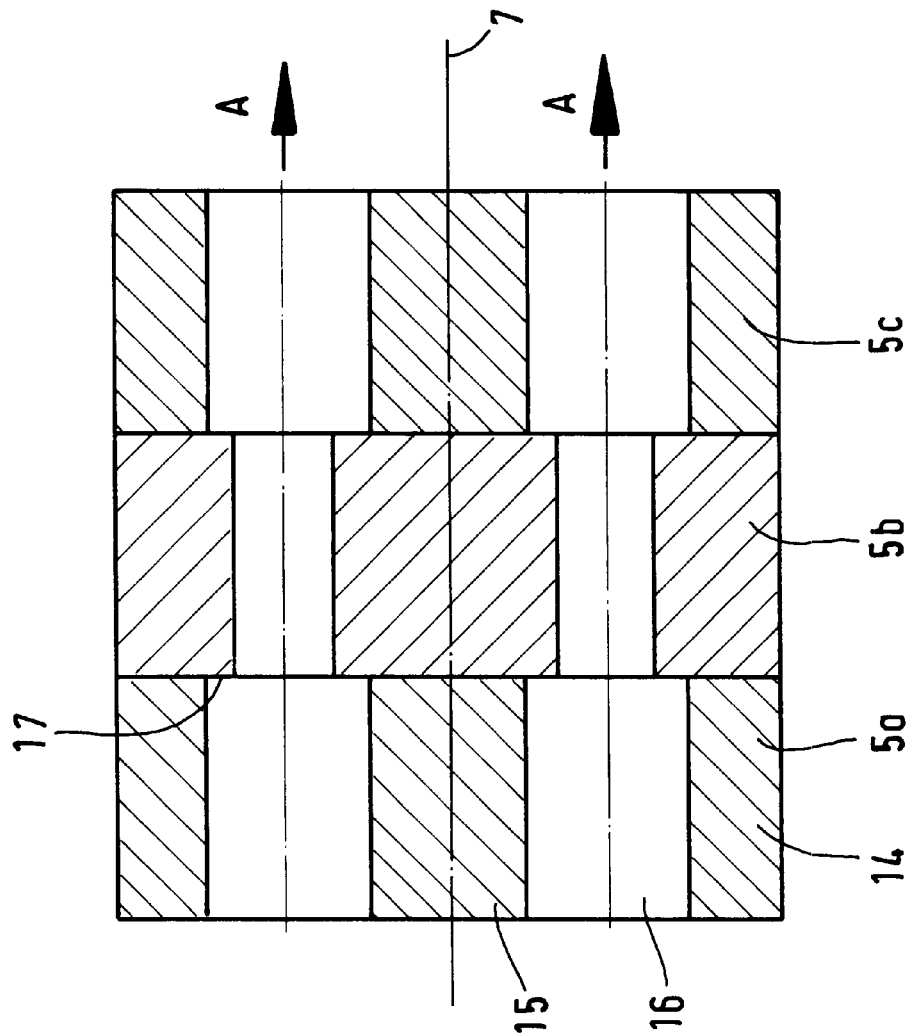

FIG. 5 another apparatus for generating flow vortices

Figure 6:
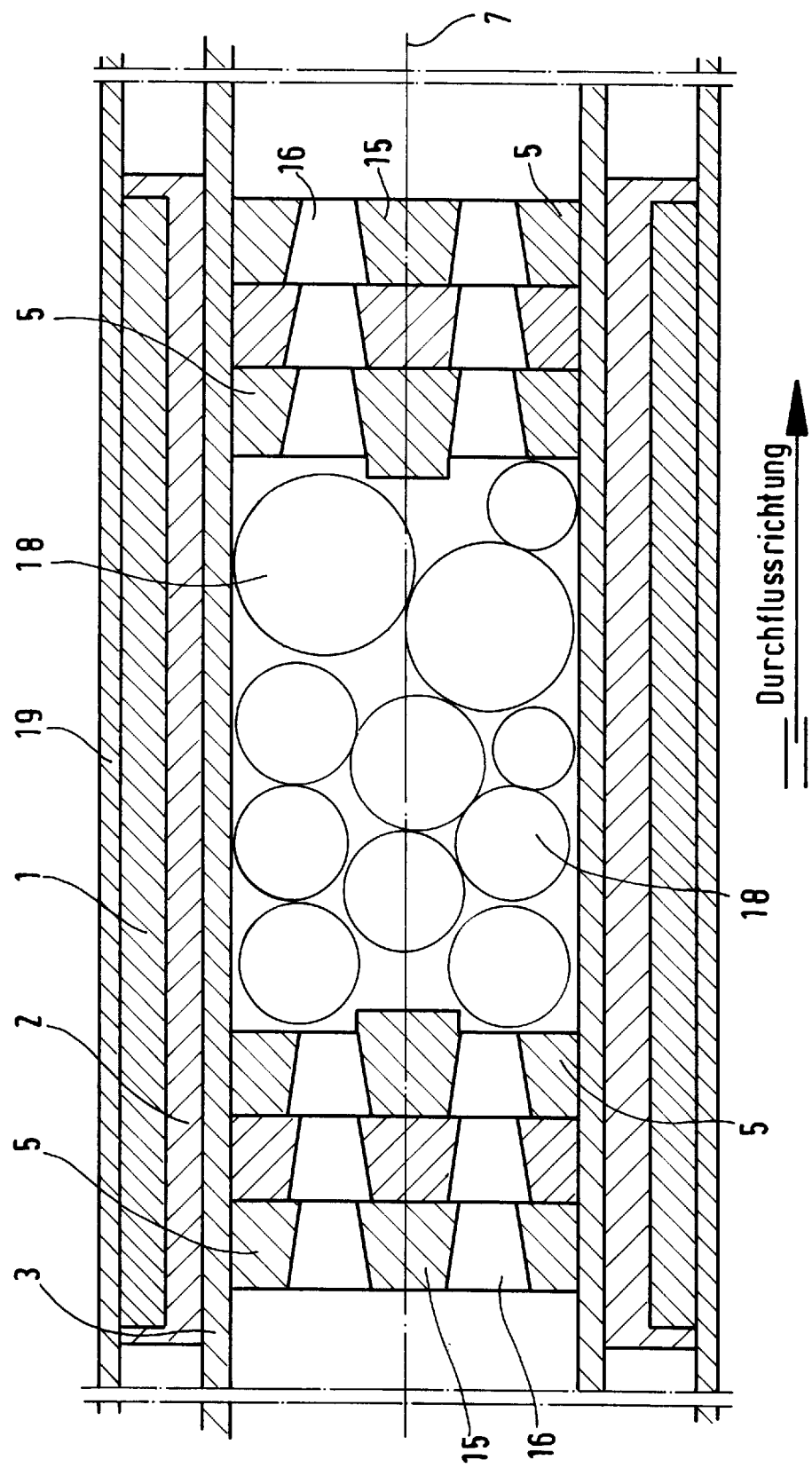

FIG. 6 another apparatus for generating flow vortices

FIG. 7 measurements for untreated water and water treated according to the invention and FIG. 8 additional measurements for untreated water and water treated according to the invention FIG. 1 shows a Klein double coil 1 used in an apparatus according to the invention. The coil 1 contains a coil core 2 around which, similar to a regular coil, rings of electrical wire are placed in individual windings. Different from regular technical methods, however, these windings are placed around the coil core 2 in "half strokes" to form a V-shaped knot line 12. The direction of the coil windings is reversed at the tip of the V in the knot line 12 resulting in a placement of the knots in an upward direction. Thus, the Klein coil consists of opposing wire wrappings. All these factors contribute to the field distribution, as indicated by the field lines 13, whenever a current flows through the coil.

FIG. 2 shows an apparatus according to the invention equipped with a is flow pipe 3 which is surrounded by altogether three Klein double coils 2a, 2b, and 2c. The distribution of the magnetic poles in the Klein double coils is indicated. The whole assembly creates a rotational symmetry around the axis 6 of the coils 2a, 2b, and 2c as well as around the axis 7 of the flow pipe through which water runs in the direction of the arrow A. If water flows through the flow pipe 3 in the direction of the arrow A while a current is sent through the Klein double coils 2a, 2b, and 2c, the water will be treated.

FIG. 3 shows another assembly according to the invention in which appropriate references have been used for individual elements instead of descriptions. The flow pipe 3 is now surrounded by four Klein double coils 2a, 2b, 2c, and 2d which have been placed sequentially behind each other inside the flow pipe 3 in the direction of the water flow A. The Klein double coils are connected to a switch board 4 through the electrical wires 9a and 9b. These wires serve as the power connection and provide the individual coils with a current. The switch board 4 serves as a controlling device for the strength of the current and thereby controls the conversion process of the water. The coils can be supplied with a direct current or a positive square wave current with a frequency matching the particular resonance frequency of algae, parasites, bacteria, viruses and other harmful organisms in the water. The electronic control is conducted through a freely selectable broad band using sweeper control and applying freely selectable time criteria. This will allow suppression, for example, of undesirable algae and virus growth during by-pass circulation in swimming pools.

An assembly of conical disks 5 is placed at the input opening inside the flow pipe 3. These disks are connected to the flow pipe 3 with the flanges 8a and 8b. This arrangement of conical disks is illustrated in FIG. 4 in more detail. This assembly altogether includes three conical disks 5a, 5b, and 5c whose outer walls 14 converge in flow direction A of the water. As shown in FIG. 4, a cone-shaped section 15 with expanding walls in flow direction A is present in the center axis 7 of the conical disks 5a, 5b, and 5c. This arrangement results in a narrowing flow opening 16 which forms in rotational symmetry around the axis 7 of the conical disk assembly 5 between each cone-shaped section and the outer wall 14 of each conical disk. This flow opening widens suddenly at the transition point to the next conical disk. The turbulent flow pattern which is thus created at these points enhances the treatment water passing through.

FIG. 5 shows another apparatus for generating turbulent flow patterns which can be used as an alternative to the conical disks displayed in FIGS. 3 and 4. This apparatus is characterized by several disks 5a, 5b, and 5c which each have an outer wall 14 and a middle spike and are placed behind each other. In rotational symmetry around the central axis of these disks 5a to 5c, this arrangement creates a volume 16 between the spike 15 and the outer wall 14, in which the fluid can flow in the direction of the arrows A. The radiuses of the central spikes 15 and the inner radiuses of the outer walls 14 are chosen in such a way that the cross-section of the volumes 16 changes from one disk 5a to the next disk 5b and from 5b to 5c, respectively. The vortices forming at the transition points will cause a turbulent flow. An assembly of this kind which is shown in FIG. 5 will also enhance the treatment of the water.

FIG. 6 shows another apparatus according to the invention which contains a flow pipe 3 which is surrounded by a Klein coil 1 and 2, as described above. This coil 1 is also enclosed in an outer protective pipe 19. Two groups of conical disks 5 and 15 are inside the flow pipe. Each of these groups contains three form-fitting neighboring conical disks with a central spike 15, thus forming ring-shaped ducts 16. The two groups of three conical disks 5 and 15 are arranged with space between them. The space between these two groups of conical disks inside the flow pipe 3 is filled with vortex bodies, e.g., with glass beads 18 and 18' of variable sizes as in this particular example. These vortex bodies ensure that turbulent flow exists at all available flow speeds between the vortex disks 5 of both groups along the complete length of the flow pipe.

FIGS. 7A and 7B show measurements of untreated tap water (tap water of the town of Neuss) in graph 20, and of water which was treated with an apparatus according to FIG. 6. See graphs 21 and 22. The measurement was performed with the electro-luminescence device PMS 2, and the bio-photon emission was measured with a photo multiplier. 102 ml of the water selected for testing was poured into a bottle made from optical glass and placed inside the darkroom of the measuring device. After adaptation to darkness, two platinum electrodes were inserted into the test sample to apply electrical stimulation. The darkness adaptation lasted one minute; the measuring interval was 100 ms; the stimulation exposure for the electrical stimulation lasted 4 s with a stimulating voltage of 50 V. FIG. 7A shows a linear representation of the biophoton emission after such stimulation for untreated water (graph 20) and for water that was treated with the apparatus according to the invention (graphs 21 and 22). FIG. 7B shows the same measurements in logarithmic representation.

The sample was stimulated three times for each measurement.

There are significant differences between the untreated and the treated water samples. The treated water has higher biophoton emission than the untreated water. This allows the conclusion that the water treated with the apparatus according to the invention has been changed.

The FIGS. 8A and 8B show dark field photographs of untreated London tap water (FIG. 8A) and London tap water after treatment according to the invention (FIG. 8B). The photographs were analyzed as dark field photographs (2000×) in phase-contrast illumination and at a sample angle of 3.4 degrees. This makes it possible to determine interactions between photons and colloids.

The structural difference of the treated water is easily recognizable in the very different structure of the pressure field phase-contrasts of FIG. 8B.

What is claimed is:

1. Apparatus for treating fluids comprising a flow pipe, at least one Klein coil surrounding the flow pipe, and a source of electric current connected to the at least one Klein coil for generating a magnetic field within the flow pipe having an infinite divergence.

2. Apparatus according to claim 1 wherein the at least one Klein coil comprises several Klein coils serially arranged along the flow pipe, each coil being connected to the source of electric current so as to generate a magnetic field of infinite divergence within each coil and within the flow pipe.

3. Apparatus according to either claim 1 or 2 further comprising at least one device for generating turbulent flow conditions placed inside the flow pipe.

4. Apparatus according to claim 3 wherein the at least one device for generating turbulent flow conditions is placed, in flow direction, in front of a first of the at least one Klein coil.

5. Apparatus according to claim 3 wherein the at least one device for generating turbulent flow conditions comprises a conical disk.

6. Apparatus according to claim 5 wherein the at least one device for generating turbulent flow comprises several form-fitting conical disks arranged sequentially in flow direction in front of a first of the at least one Klein coil so that a larger opening of each subsequent conical disk in the flow direction touches a smaller opening of the previous conical disk.

7. Apparatus according to claim 3 further comprising several disks characterized by an outer wall and a spike arranged sequentially in flow direction to control turbulent flow conditions, and so that there are openings between the outer wall and the central spike of neighboring disks of different cross-sections.

8. Apparatus according to claim 5 wherein several of the conical disks are arranged in flow direction with space between them.

9. Apparatus according to claims 1 or 2 further comprising at least one vortex body arranged inside the flow pipe.

10. Apparatus according to claim 9 wherein the at least one vortex body comprises a plurality of vortex bodies of varying sizes.

11. Apparatus according to claim 10 wherein the vortex bodies are beads.

12. Apparatus according to claim 10 wherein the vortex bodies are arranged throughout the flow pipe.

13. Apparatus according to claim 3 further comprising several disks characterized by an outer wall and a spike arranged sequentially in flow direction to control turbulent flow conditions, and so that there are openings between the outer wall and the central spike of neighboring disks are offset against each other.

14. Apparatus according to claim 5 wherein several of the conical disks are arranged in groups of neighboring conical disks with spaces between the groups.

15. Apparatus according to claim 14 further comprising vortex bodies placed in said spaces between the groups of neighboring conical disks.

16. Apparatus according to claim 8 further comprising vortex bodies placed in said space between the conical disks.

17. Apparatus according to claim 11 wherein the beads are composed of glass.

18. Apparatus according to claim 1 or 2 wherein about two-thirds ($2/3$) of the magnetic field force is present at the ends or each Klein coil and one-third ($1/3$) is present in the center of each coil.

19. Method for treating fluids comprising the steps of:

providing a flow pipe surrounded by at least one Klein coil, initiating a flow of fluid to be treated through the flow pipe, and sending an electrical current through the Klein coils to generate a magnetic field within the flow pipe having an infinite divergence.

20. Method according to claim 19 wherein the electrical current comprises a direct current.

21. Method according to claim 19 wherein the electrical current is a square wave current that has a frequency that is equivalent to the resonance frequency of algae, bacteria, viruses, parasites and similar organisms.

22. Method according to claim 19 wherein the electrical current comprises a positive square wave current.

* * * * *

UNITED STATES PATENT AND TRADEMARK OFFICE
CERTIFICATE OF CORRECTION

PATENT NO.   : 6,482,318 B1
DATED        : November 19, 2002
INVENTOR(S)  : Dietrich Reichwein et al.

Page 1 of 1

It is certified that error appears in the above-identified patent and that said Letters Patent is hereby corrected as shown below:

<u>Title page,</u>
Item [76], delete the word "Zall" and insert -- Zell --; and delete the word "Paters" and insert -- Peters --.

Signed and Sealed this

Twenty-fifth Day of February, 2003

JAMES E. ROGAN
*Director of the United States Patent and Trademark Office*